(No Model.) 2 Sheets—Sheet 1.

J. ABELL.
Spark Arrester.

No. 241,579. Patented May 17, 1881.

Witnesses:—
Louis Whitehead
Gordon Aird

Inventor:—
John Abell
by Ridout & Aird
Attys

N. PETERS, Photo-Lithographer, Washington, D. C.

(No Model.) 2 Sheets—Sheet 2.

J. ABELL.
Spark Arrester.

No. 241,579. Patented May 17, 1881.

Witnesses:—
Louis Whitehead
Gordon Avid

Inventor:—
John Abell
by Ridout Aird & Co
Attys

UNITED STATES PATENT OFFICE.

JOHN ABELL, OF WOODBRIDGE, ONTARIO, CANADA.

SPARK-ARRESTER.

SPECIFICATION forming part of Letters Patent No. 241,579, dated May 17, 1881.

Application filed June 24, 1880. (No model.) Patented in Canada June 7, 1879, and July 22, 1879.

*To all whom it may concern:*

Be it known that I, JOHN ABELL, of the village of Woodbridge, in the county of York, in the Province of Ontario, Canada, have invented new and useful Improvements in Spark-Arresters, of which the following is a specification.

My invention has relation to a spark extinguisher and arrester for the smoke-pipes and chimneys of boilers and furnaces, but which is more particularly designed for use on such as are of a portable character for agricultural purposes, in the use of which boilers on farms great danger is incurred by the escape of sparks.

Figure 1:
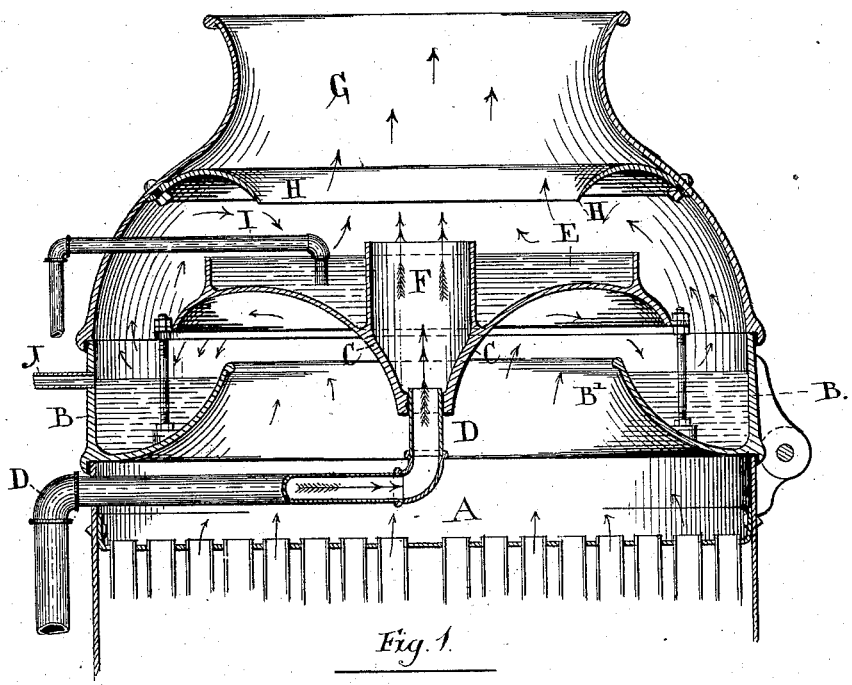
Figure 2:
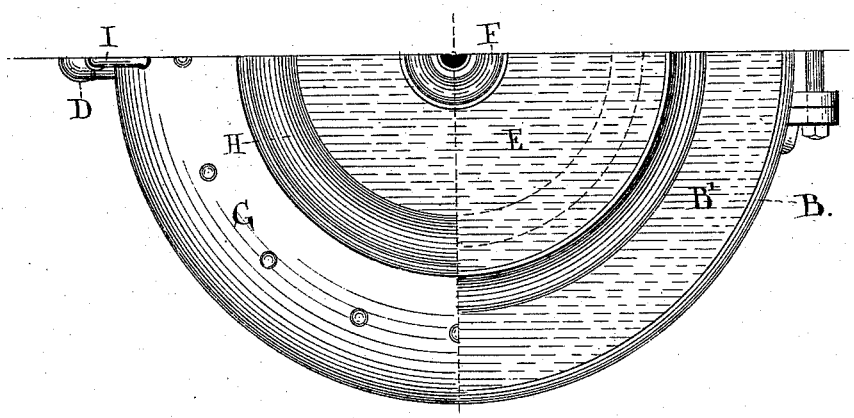
Figure 3:
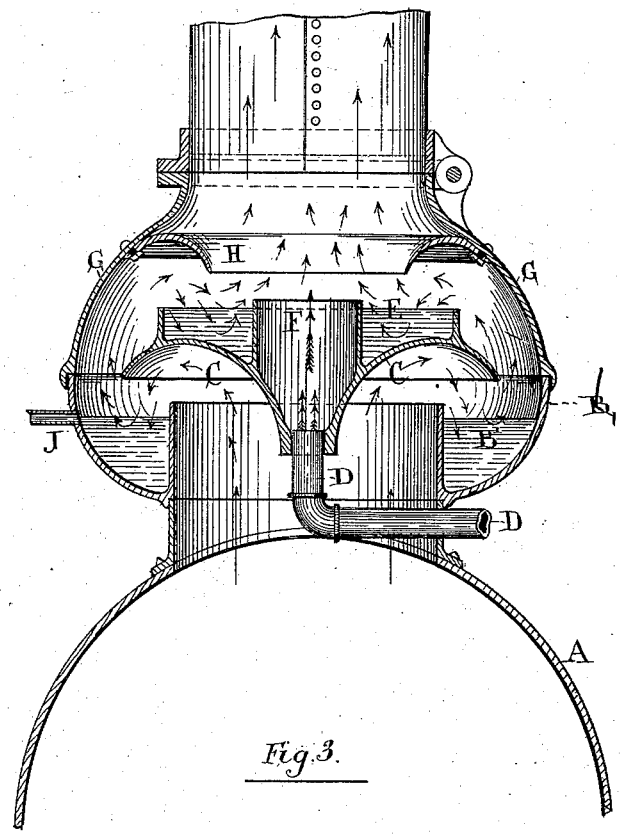

In the accompanying drawings, Figure 1 is a cross-section, and Fig. 2 a half-plan, of a spark extinguisher and arrester embodying my improvements and shown as applied to a vertical boiler. Fig. 3 is a view of the same applied to a horizontal boiler.

In Fig. 1, A is the top of a vertical boiler, upon which is placed an annular casting, B, forming a smoke-box. On the inside of this casting a rib is provided, which curves inwardly and upwardly to a suitable extent to form an annular water-receptacle extending around the whole smoke-discharge opening. Over the smoke-opening a conical casting, C, is supported in any suitable manner, preferably by stud-bolts, as shown. The point of the cone is placed immediately in the center of the smoke-opening, and curves upwardly and then slightly down, forming a circular concave inflector, whose edge partly overlaps the first water-receptacle all around, but at a sufficient height above it to allow of the proper escapement of the smoke. The center of the cone is hollow, and a circular opening is provided at its apex, into which the end of the exhaust-steam pipe D is entered, as shown. On the upper side of the connecting smoke-deflector a second annular water-receptacle, E, is provided, as shown, said receptacle extending concentrically with the edge of the deflector around a central opening, F, which is provided for the upward direct escape of the exhaust-steam entering at the apex of the cone, as before stated.

G is a dome-shaped cover, forming a continuation of the smoke-box on which it is supported, and provided with a smoke-opening at the top, as shown.

H is a deflecting-plate secured to the inner side of dome by bolts, rivets, or in any suitable manner. This plate extends inwardly a suitable distance, overlapping the outer edge of the upper water-receptacle, E, and curves downward at a suitable angle to deflect the smoke, sparks, &c., into the water of the upper reservoir. The position of the plate E above the water-receptacle is such that sufficient room is allowed for the proper passage of the smoke between the edge of the deflective plate and the surface of the water.

I is the water-feed pipe from the engine or other pump, and J the overflow-water pipe, arranged substantially as shown.

In operation the smoke and sparks rising from the boiler strike against the concave face of the cone C and are deflected, as shown by arrows, upon the water in the first outer receptacle. As the smoke rises again the curve of the dome and the deflecting-plate H cause a second deflection upon the water in the upper receptacle. In addition to the double deflection of the smoke, sparks, &c., upon the water, they are forced to pass through a thin curtain of water which is constantly overflowing from the upper water-receptacle over the edge of the cone into the lower water-receptacle. The central independent discharge of the exhaust-steam causes sufficient draft to force the smoke through the passage and to move the current with sufficient velocity to accomplish the necessary deflections into the water-receptacles.

In Fig. 3 the spark extinguisher and arrester is shown as applied to a horizontal boiler. In this case the construction is substantially the same as for the vertical boiler, with the exception that the parts are supported upon a curved flanged collar which is riveted around the opening into the smoke-box. A hinged smoke-conducting pipe is also connected onto the top of dome to furnish the increased draft required in this class of boiler.

I am aware that a water-receptacle placed in connection with deflecting-plates in small pipes of boilers and furnaces for extinguishing sparks is not new, and I do not claim such, broadly, as my invention; but

What I claim as new, and desire to secure by Letters Patent, is—

1. The combination, with the open lower receptacle, B, of the smoke-deflecting cone C, provided with an open water-receptacle, E, on its upper side, the whole adapted to arrest and extinguish sparks, substantially as described.

2. The combination, with the upper and lower water-receptacles and the deflecting-cone provided with the central steam-outlet, of the domed cover G, substantially as shown and described.

3. The smoke-deflecting plate H, in combination with the dome G and the cone C, provided with the upper water-receptacle, E, substantially as shown and described.

4. The combination of the upper and lower water-receptacles, the deflecting-cone provided with the central steam-outlet, the domed cover G, and the deflecting-plate H, whereby the smoke and sparks are deflected twice into water, and forced to pass through the overflow of water from the upper water-receptacle to the lower, substantially as and for the purpose set forth.

JOHN ABELL.

Witnesses:
GEORGE A. AIRD,
H. H. WARREN.